United States Patent [19]
Takeda et al.

[11] Patent Number: 5,223,824
[45] Date of Patent: Jun. 29, 1993

[54] DISPLAY APPARATUS WITH VARIABLE SCAN LINE SELECTION

[75] Inventors: Makoto Takeda, Nara; Hiroshi Take, Ikoma, both of Japan

[73] Assignee: Sharp Kabushiki Kaisha, Osaka, Japan

[21] Appl. No.: 544,977

[22] Filed: Jun. 28, 1990

[30] Foreign Application Priority Data

Jul. 11, 1989 [JP] Japan .................................. 1-180054

[51] Int. Cl.[5] ............................................. G09G 3/20
[52] U.S. Cl. ..................................... 340/813; 340/784
[58] Field of Search ............... 340/784, 811, 813, 814, 340/723, 789; 358/140, 152, 230, 241

[56] References Cited

U.S. PATENT DOCUMENTS

| | | | |
|---|---|---|---|
| 4,471,381 | 9/1984 | Kasuga et al. | 358/140 |
| 4,701,799 | 10/1987 | Yoshimura | 358/241 |
| 4,789,899 | 12/1988 | Takahashi et al. | 358/241 |
| 4,804,951 | 2/1989 | Yamashita et al. | 340/784 |
| 5,043,811 | 8/1991 | Yasuhiro | 358/140 |

FOREIGN PATENT DOCUMENTS 3209073  9/1982  Fed. Rep. of Germany .
2097219A 10/1982  United Kingdom .

*Primary Examiner*—Richard Hjerpe

[57] ABSTRACT

In a display apparatus such as a liquid crystal display or the like, which adds a switching element for each of the display picture elements arranged in a matrix shape so as to effect the active matrix driving operation, a drive system exits which is capable of varying the number of the scanning lines on the display. The drive system in the simple construction produces a display of a number of input lines, greater in number than the number of scan electrodes on the display apparatus, without producing practical deterioration in the display quality.

7 Claims, 10 Drawing Sheets

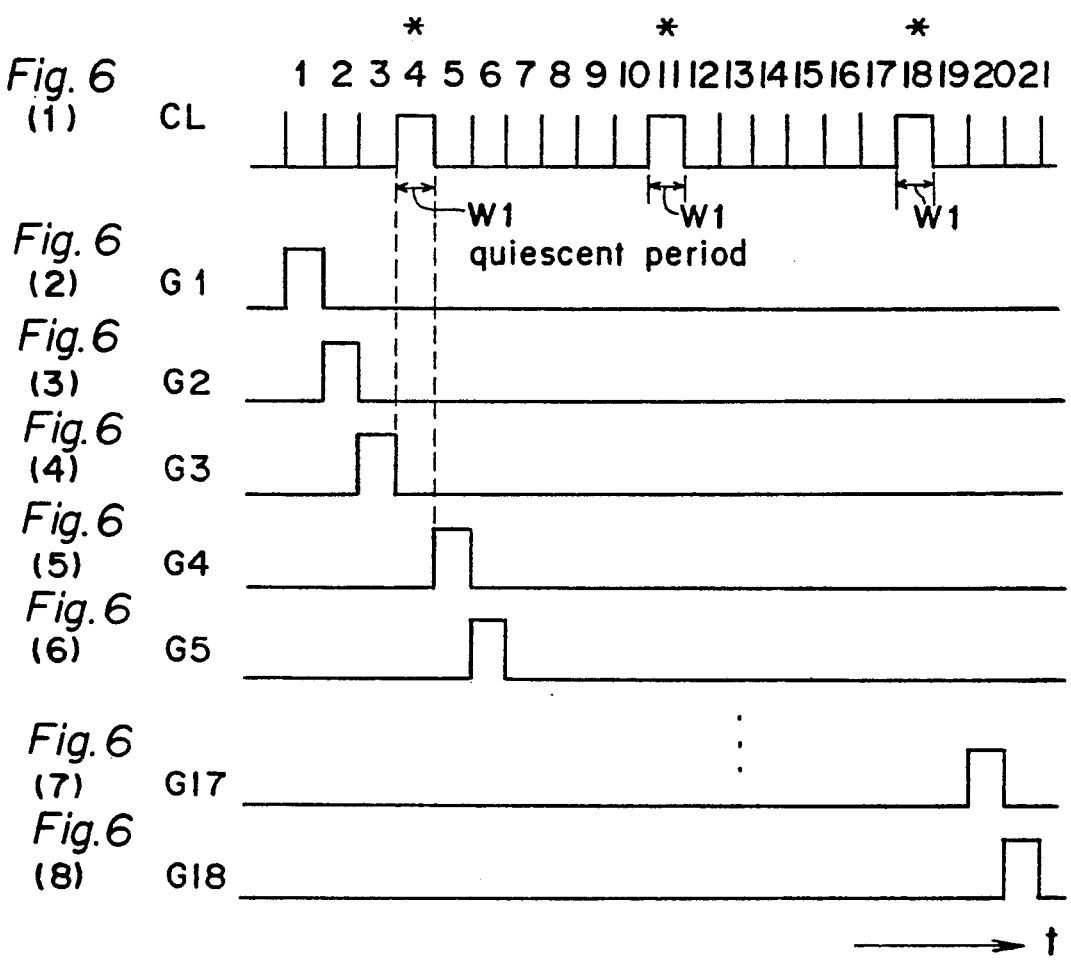

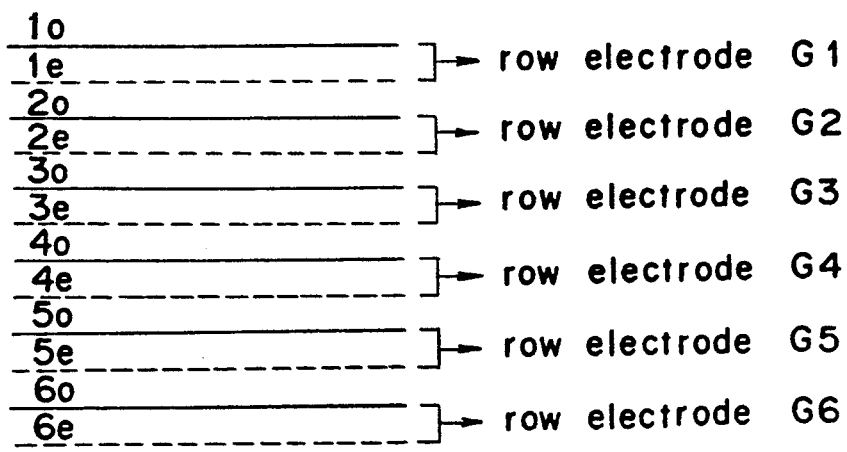
Fig. 7 (1)
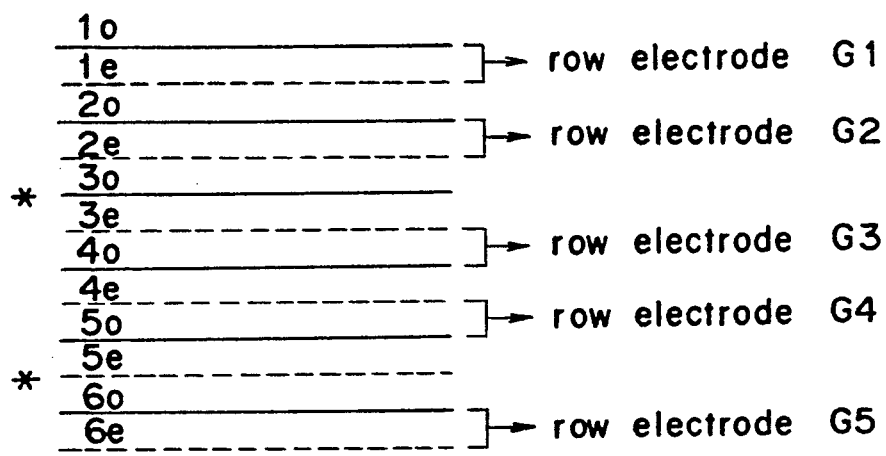
Fig. 7 (2)
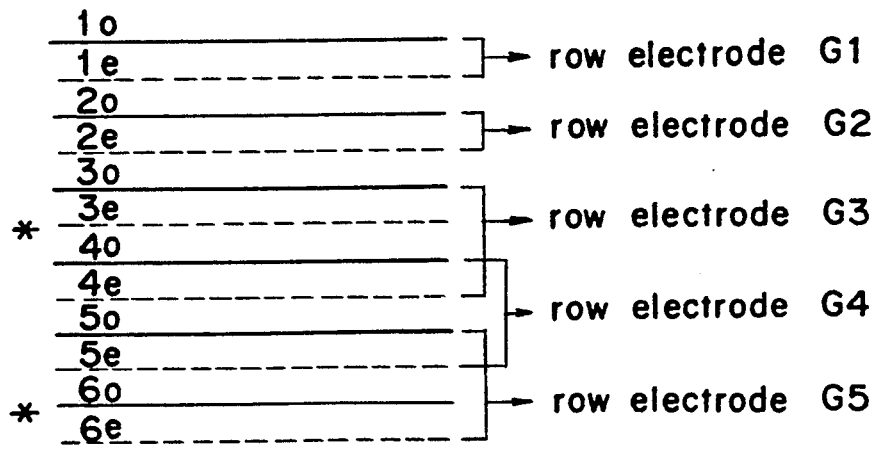
Fig. 7 (3)

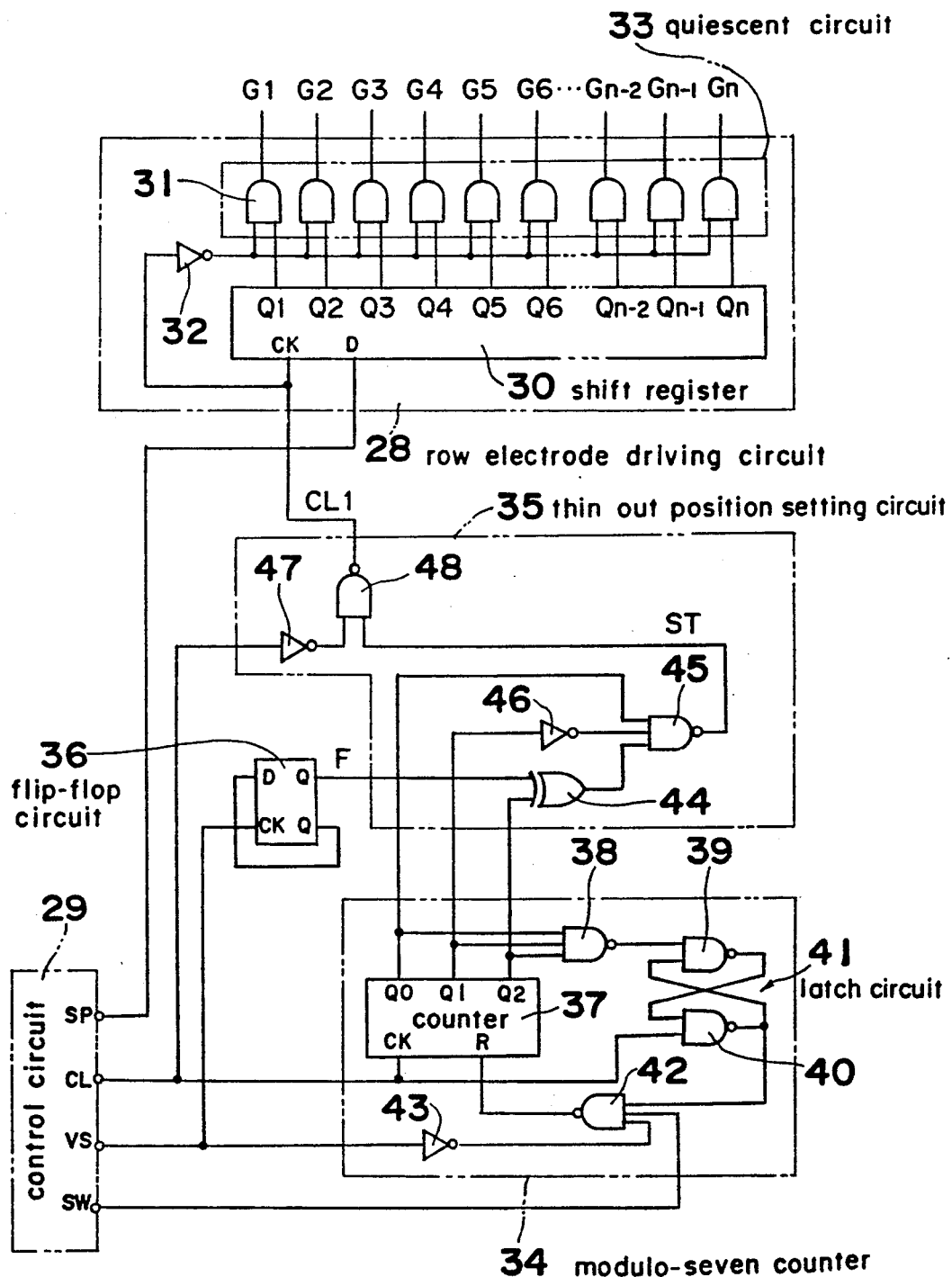

Fig. 9 (1) VS
Fig. 9 (2) CL: 6 0 1 2 3 4 5 6 0 1 2 3 4 5 6 0 1 2 3 4 5 6 0 1 2 3 4 5
Fig. 9 (3) SP
Fig. 9 (4) ST: t1 t2  6 0 1 2 3 4 5 6 0 1 2 3 4 5 6 0 1 2 3 4 5 6 0 1 2 3 4 5
Fig. 9 (5) CL1
Fig. 9 (6) G1   W1 : quiescent period
Fig. 9 (7) G2
Fig. 9 (8) G3

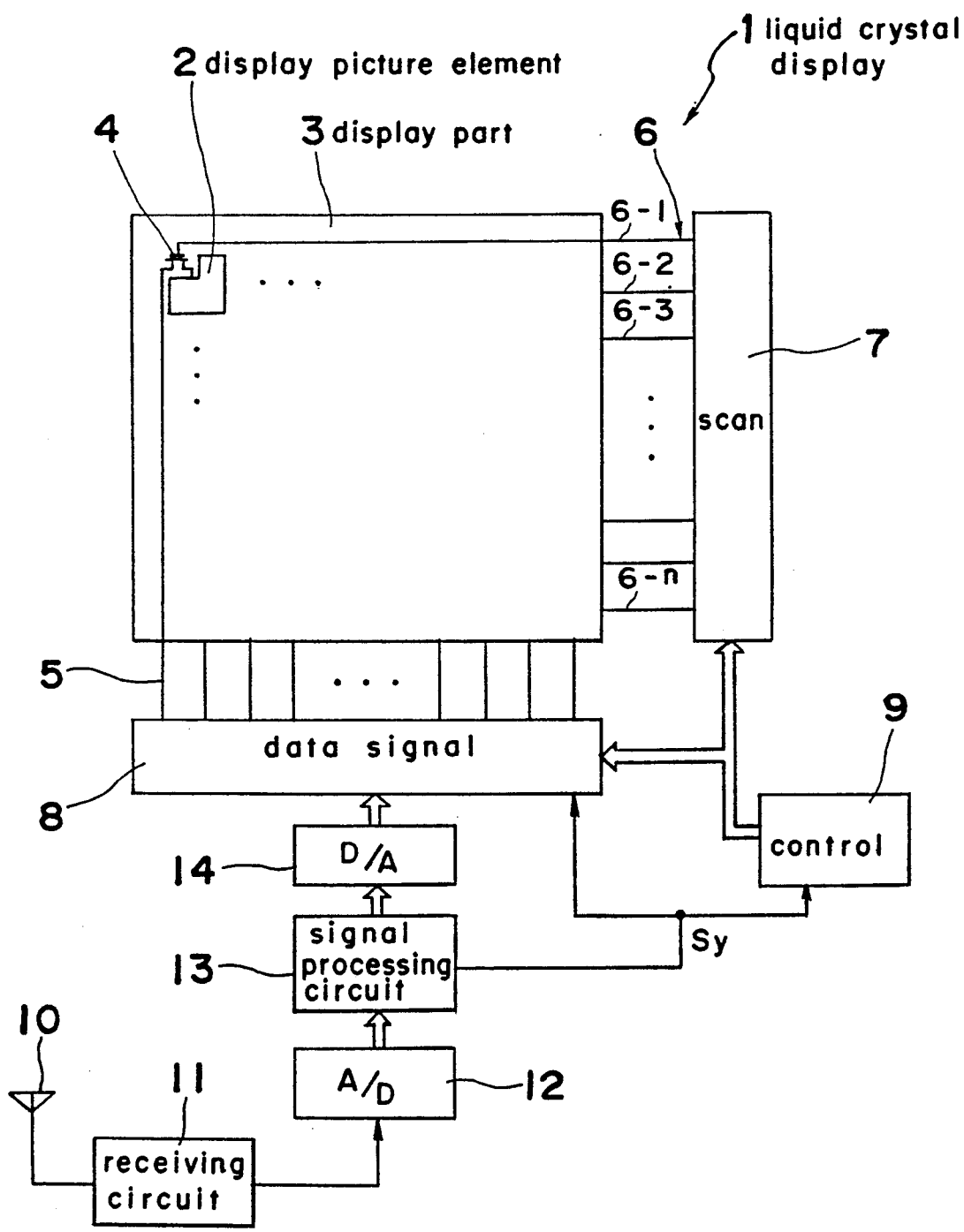

DISPLAY APPARATUS WITH VARIABLE SCAN LINE SELECTION

BACKGROUND OF THE INVENTION

The present invention generally relates to a display apparatus such as a liquid crystal display or the like, and more particularly, to a display apparatus which adds a switching element for each of the display picture elements arranged in a matrix shape so as to effect the active matrix driving operation.

A liquid crystal display is widely used as a display apparatus which is smaller in size and lighter in weight. An active matrix shaped liquid crystal display apparatus which has, for example, switching transistors added respectively to the respective display picture elements, especially with the display picture elements being arranged in the matrix shape, sequentially selects the display picture elements by the use of the switching effect of the switching transistor. It further applies the display voltage in an embodiment corresponding to the display data so as to effect the displaying operation. Such an active matrix type of liquid crystal display apparatus is often used as a monitor apparatus and so on for a television receiver, a video tape recorder, as a display apparatus which is higher in contrast, and is capable of gradation display of the multiple stages.

A block diagram of a liquid crystal display apparatus 1 in such a conventional embodiment is shown in FIG. 10. The liquid crystal display apparatus 1 is provided with a display part 3, with the display picture elements 2 being arranged in many matrix shapes, and the one-terminals of the switching transistors 4 being connected respectively with the respective display picture elements 2. The other terminals of the respective switching transistors 4 are connected respectively with the column electrodes 5, with the gates of the switching transistors 4 being connected respectively with the row electrodes 6-1, 6-2, . . . , 6-n (when necessary, they are generically named with reference character 6). The respective row electrodes 6 are respectively connected with the scanning circuit 7, and the column electrodes 5 are connected with the data signal circuit 8, so that these circuits 7, 8 are controlled in the operation by the control circuit 9.

The scanning circuit 7 makes the respective switching transistors 4 conductive, which are connected with the row electrodes 6, with the row electrodes 6 being sequentially provided as, for example, high level. At this time, the display voltage corresponding to the desired display is applied upon respective row electrodes 5. Thus, the respective display picture elements 2 effect the corresponding displays. Such display is repeated for each of the respective row electrodes 6 so as to complete the display of one image portion. Such processing is repeated, for example, each 1/60 seconds, or 1/30 seconds so as to effect the display.

When such a liquid crystal display 1 is used as a so-called liquid crystal television receiving apparatus, the picture signal of, for example, a NTSC system is used as the signal for display use. In such a case, the picture signal is received by an antenna 10. The desired picture signal is separated by a receiving circuit 11 including, for example, a detection circuit, an amplification circuit and so on. After it has been converted into the digital signal by the analog/digital converting circuit (hereinafter referred to as A/D converting circuit) 12, the various types of signal processing is effected by the signal processing circuit 13. It is then converted into the analog signal by the digital/analog converting circuit (hereinafter referred to as D/A converting circuit). It is subsequently fed into the data signal circuit 8. Further also the reference signal Sy is inputted into the circuits 8, 9 so as to effect the given scanning operation.

In such a matrix type of liquid crystal display apparatus 1 as described hereinabove, when the display is effected in accordance with the television picture signal, a driving system for feeding, into the liquid crystal display apparatus 1, the television signal by the line sequential system for each of the horizontal scanning periods is used when the number of the row electrodes 6 is close to the number of the effective scanning lines (approximately 480 lines in the NTSC system) of the television signals, or when it is close to ½ the number of effective scanning lines. At this time, when the row electrodes 6 are close in number to the effective scanning lines, the display of one image portion of the display part 3 is effected for each of the frame periods. When the line of the row electrodes is close in number to the effective scanning lines, the display of one image of the display part 3 is effected for each of the field periods.

When the number of the row electrodes 6 is comparatively small with respect to the number of the above described effective scanning lines and ½ the number thereof, the horizontal scanning lines within one vertical scanning period of, for example, the picture signal are allotted into the row electrodes 6 from the upper side in the vertical scanning direction when such display as described hereinabove has been effected, the two electrodes 6 are allotted, completed before the picture signals of all the scanning line number portion are inputted, and the display with the lower portion of the proper image being omitted in it in the display part 3. When the residual picture signals have been displayed by the display part 3, with the pictures signals of the omitted portion being removed from the head of one vertical scanning period, the display with the upper portion of the proper picture signal being omitted in it is effected when the residual picture signals have been displayed in the display part 3.

When the number of the row electrodes 6 is comparatively smaller than the number of the effective scanning lines ½ and the number thereof, a method of thinning out the picture signals corresponding to the specified scanning lines among the picture signals within one vertical scanning period is used so as to apparently display the proper whole image. This method is similarly effected even in a case where, for example, the picture signals of a PAL system (the number of the scanning lines is 625) are converted into the signals of a NTSC system (the number of the scanning lines is 525) or in the other cases. Such a signal processing, as performed at present, of thinning out the picture signal corresponding to a scanning line or the picture signal corresponding to a plurality of scanning lines is effected in the digital circuit such as a signal processing circuit 13 or the like shown in FIG. 10 in terms of the processing accuracy or the like. Therefore, such an A/D conversion circuit 12, a signal processing circuit 13, a D/A conversion circuit 14 and so on as described hereinabove become indispensable, with a problem that the circuit structure becomes extremely complicated.

SUMMARY OF THE INVENTION

Accordingly, the present invention has been developed with a view to substantially eliminating the above discussed drawbacks inherent in the prior art, and has for its essential object to provide a display apparatus.

Another important object of the present invention is to provide a display apparatus of the type referred to above, which is capable of varying the number of the scanning lines on the display in the simple construction and without any deterioration in the display quality.

In accomplishing these and other objects, according to one preferred embodiment of the present invention, there is provided a display apparatus which includes a display means with a plurality of display picture elements being arranged in a matrix shape, a plurality of two electrodes for selecting one of a plurality of display picture element columns in the column direction along the horizontal scanning direction, a plurality of column electrodes for applying the signals at the same time upon a plurality of display picture elements columns along the column direction, with the display being effected in accordance with the picture signals. The apparatus further comprises a row electrode selecting means for sequentially specifying the respective row electrodes, a column electrode driving means for outputting the display data corresponding to the picture signals into the respective column electrodes, a stop signal generating means for having a clock signal inputted thereinto and outputting a stop signal, for a stop period to be predetermined, to stop the selecting operation of the row electrode selecting means for every other number of the horizontal scanning lines to be predetermined so as to select the output time within one frame of the stop signal, so that at least one horizontal scanning period may be emptied along the column direction.

According to the present invention, when the number of the row electrodes provided on the display means is less than the number of the scanning lines in one vertical scanning period of the picture signal in the displaying operation on the display means with a plurality of display picture elements being arranged in the matrix shape, the stop signal generating means outputs to the row electrode selecting means a stop signal which stops, across the stop period to be predetermined, the selecting operation of the row electrode selecting means for every other number of the horizontal scanning lines to be predetermined. The row electrode selecting means sequentially specifies a plurality of row electrodes which select the display picture element row in the row direction along the horizontal scanning direction.

Accordingly, in the above described stop period, the selecting operation of the row electrode is stopped while the picture signals are inputted into the display apparatus, and the picture signals across the stop period are thinned out. Even when the number of the row electrodes of the display apparatus is smaller than the number of the scanning lines of the picture signal, the pictures within the whole range in the vertical scanning period may be displayed.

Also, the output time within one frame period of the picture signal is generated so that at least one horizontal scanning period may be emptied along the vertical scanning direction. Therefore, when the thinning out processing is effected for each of the respective field periods of the picture signal, a situation where the scanning lines thinned out for each of the field periods become adjacent in the vertical scanning direction within one frame period is prevented, so as to prevent the deterioration of the display quality.

BRIEF DESCRIPTION OF THE DRAWINGS

These and other objects and features of the present invention will become apparent from the following description taken in conjunction with the preferred embodiment thereof with reference to the accompanying drawings, in which;

FIGS. 6(1)-6(8) are time charts for describing the operation of FIGS. 5(1)-5(2).

FIGS. 7(1)-7(3) are charts for illustrating the operation of the present embodiment;

FIG. 8 is a block diagram showing the construction of one portion of the liquid display apparatus in another embodiment of the present invention;

FIGS. 9(1)-9(15) are charts showing the operation in the construction of FIG. 8; and FIG. 10 is a block diagram showing the construction of the liquid crystal display apparatus 1 in the typical conventional example.

DETAILED DESCRIPTION OF THE INVENTION

Figure 1:
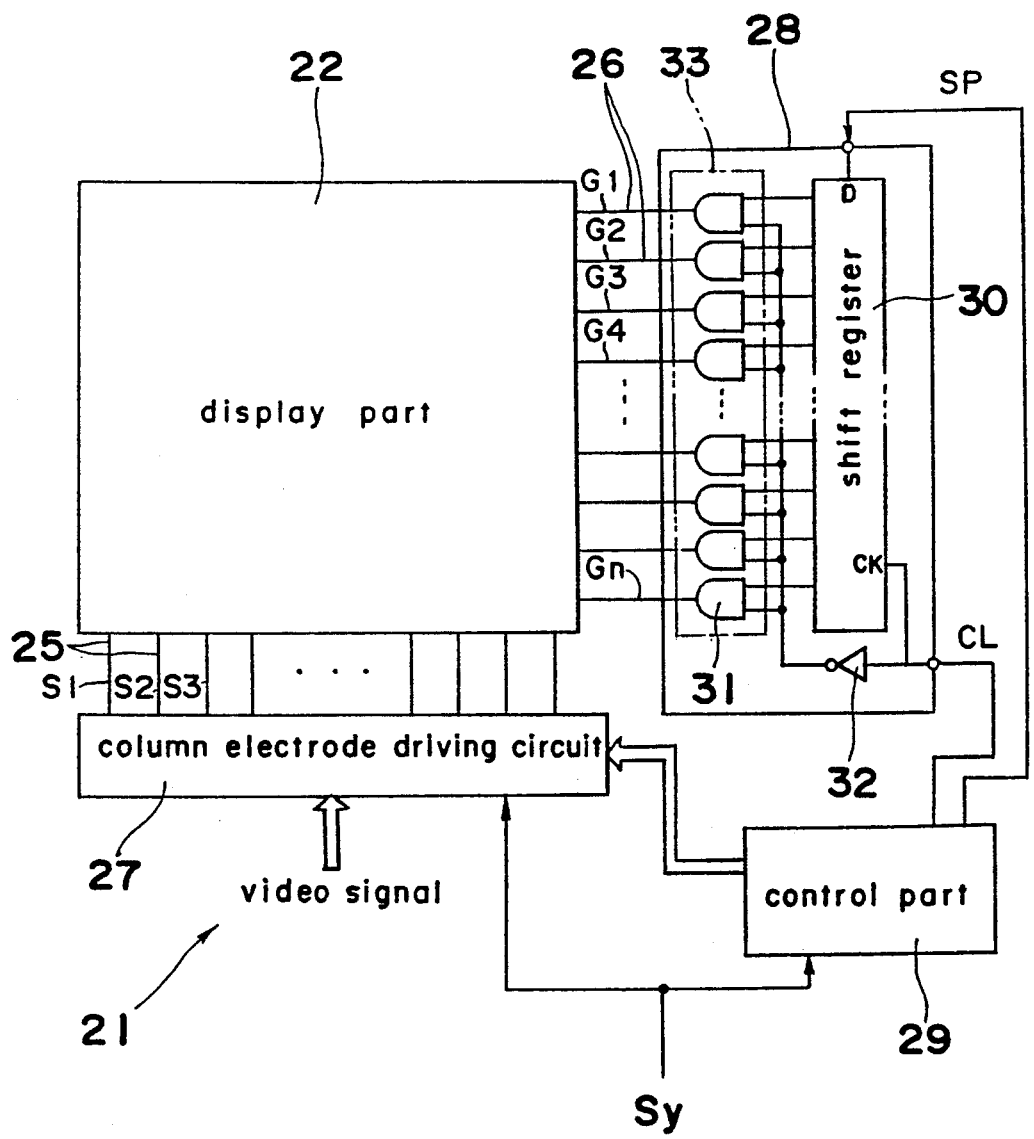
FIG. 1 is a block diagram showing the construction of a liquid crystal display apparatus 21 in one embodiment of the present invention.

Before the description of the present invention proceeds, it is to be noted that like parts are designated by like reference numerals throughout the accompanying drawings.

Figure 2:
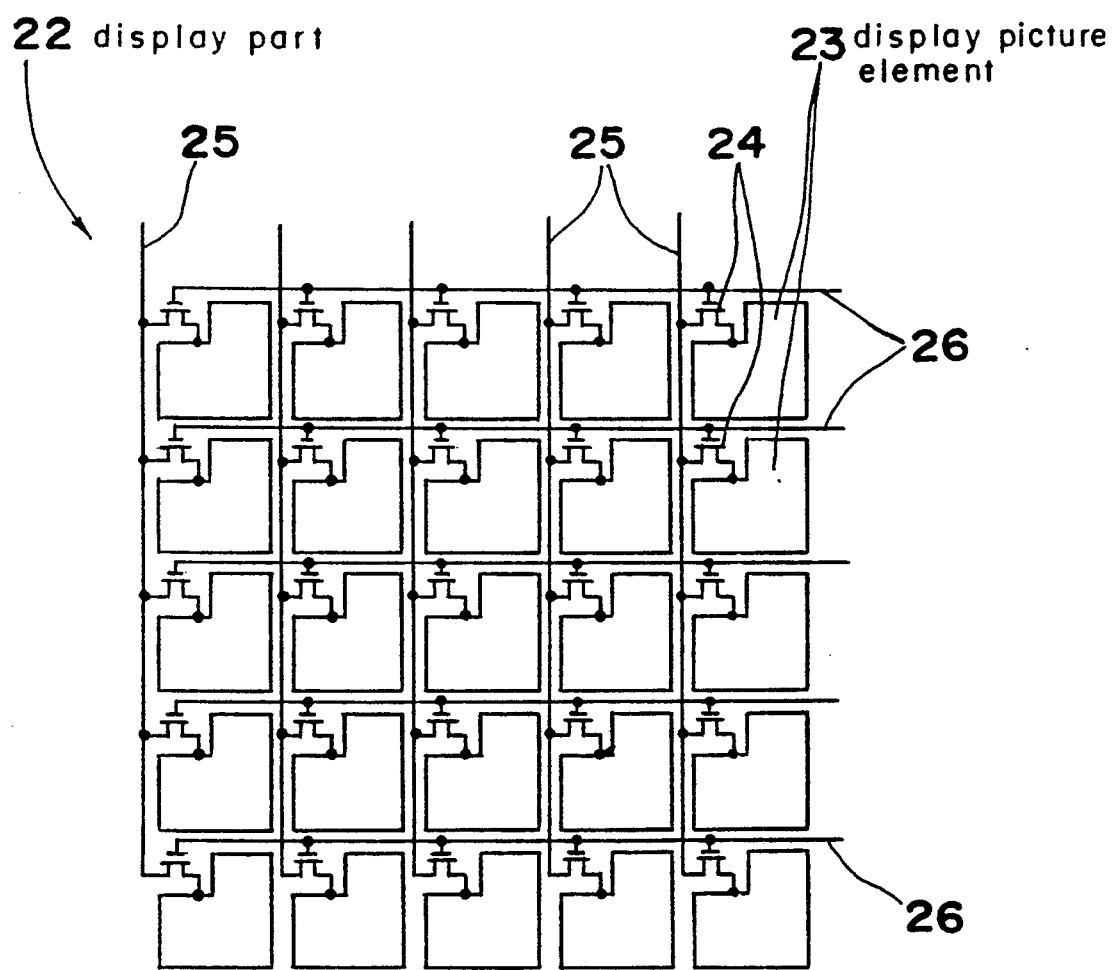
FIG. 2 is an electric circuit diagram showing the electric construction of a display part 22.

Referring now to the drawings, there are shown in FIG. 1 a block diagram showing the construction of a liquid crystal display apparatus 21 which is a display apparatus in one embodiment of the present invention. In FIG. 2 a system chart showing the construction of a display part 22 which is a display means of the liquid crystal apparatus 21. A liquid crystal display apparatus 21 will be described hereinafter with reference to these drawings. As shown in FIG. 2, the liquid crystal display apparatus 21 is provided with the described display part 22 with the display picture elements 23 composed as display electrodes being arranged in a matrix shape. Switching transistors 24 to be realized as TFT (thin membrane transistors) elements and so on are arranged respectively on the respective display picture elements 23.

The output terminal of the switching transistor 24 is connected with the display picture element 23, with the input terminal being connected with the column electrode 25 to be provided for each of the display picture elements in the column direction (the vertical direction of FIG. 2) along the vertical scanning direction. The gate of the switching transistor 24 is connected respectively with the row electrode 26 to be formed for each of the display picture element columns in the row direction along the horizontal scanning direction. The respective column electrodes 25 are connected with the column electrode driving circuit 27 which is the column electrode driving means, and the row electrode 26 is connected with the row electrode driving circuit 28 which is the row electrode selecting means. The respective driving circuits 27, 29 are controlled in the operating condition thereof by a control circuit 29 which is the stop signal generating device composed, including, for example, a microprocessor and so on. The reference signals Sy such as vertical synchronizing signal, horizontal synchronizing signal and so on which are separated from the picture signal to be fed into the liquid crystal display apparatus 21 are inputted into the control circuit 29.

The row electrode driving circuit 28 is provided with a shift register 30 which has the bit number of the number of the row electrodes 26 with the clock signal CL from the control circuit 29 being provided as the clock input, and the scanning starting signal SP being provided as the input data. The output for each of the respective bits of the shift register 30 is given to the respective row electrodes 26 through the corresponding AND circuit 31. The signal with the clock signal CL being inverted by the inversion circuit 32 is input into the other input of the AND circuit 31, and these ANDs 31 construct a quiescent circuit 33 which realizes the function to be described later.

Figure 3:
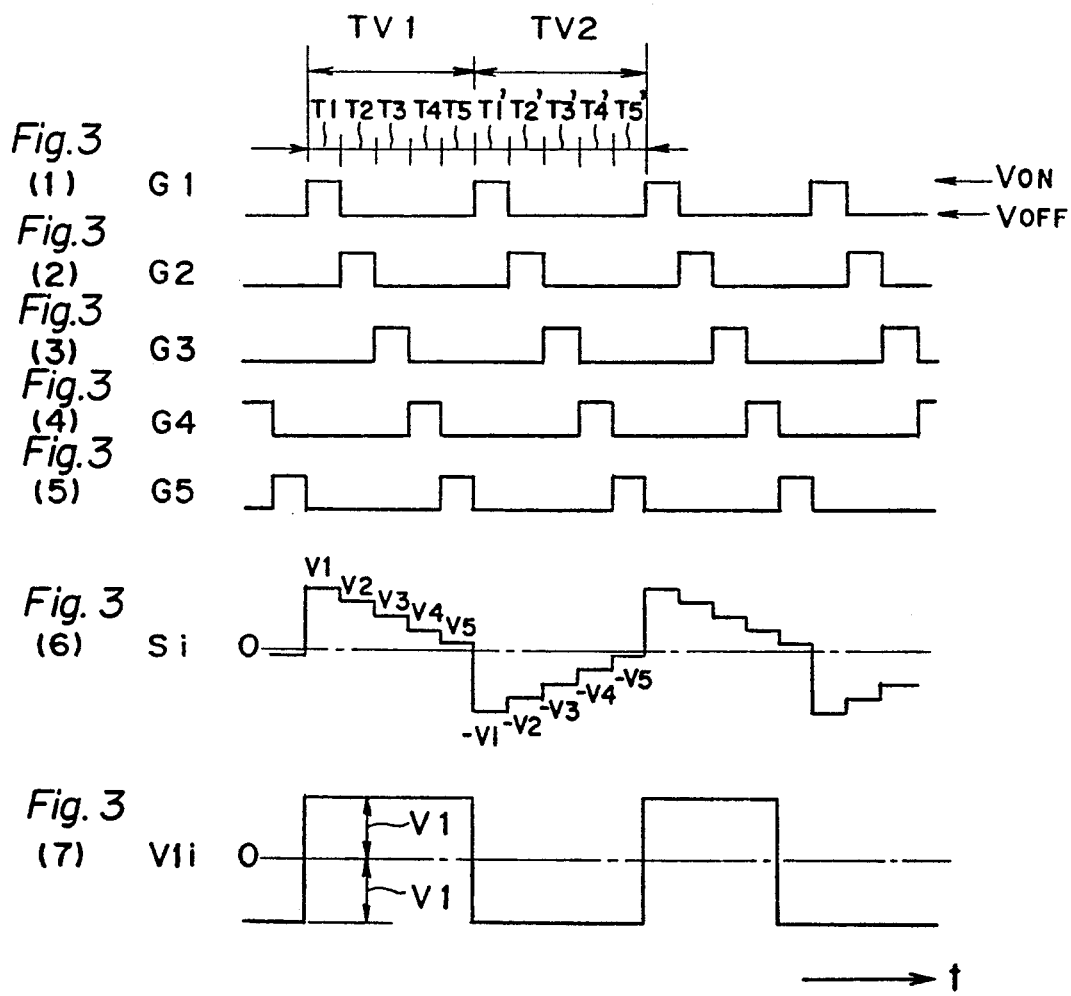
FIGS. 3(1)-3(7) are time charts showing the operation in the construction example of FIG. 2.

FIG. 3 is a time chart for describing the basic display operation of the display part 22 of the liquid crystal display apparatus 21. The display operation of the display part 22 will be described with reference to FIG. 3. In order to simplify the description, the column electrode 25 and the row electrode 26 will be described in a case where they are respectively five, with the reference characters G1, G2, ..., G5 being given individually to the row electrodes 26. Such scanning signals G1 through G5 as described in FIG. 3 (1) through (5) along the vertical scanning direction (in a direction from the upper portion of FIG. 1 to the lower portion) are sequentially in time applied upon the respective row electrode G1 through G5. The signal Si of FIG. 3 (6) is a signal wave form to be applied upon a certain column electrode 25, with the v1 through v5 being the display voltage is an example to be applied upon the respective display picture elements 23 through the switching transistor 24 connected with each of the five row electrodes G1 through G5.

With the observation of the display picture element 23 connected with the first row electrode G1 in the vertical scanning direction, the switching transistor 24 becomes conductive during the period T1 by the scanning signal G1, and the display voltage v1 is applied upon the display picture element 23 during this period. The application operation of such display voltage is effected on the respective column electrodes 25 across the driving period T1. Also, in the remaining periods T2 through T5 except for the driving period T1, the switching transistor 24 becomes interrupted, with the applied voltage v1 being retained at the liquid crystal capacity of the liquid material (not shown) corresponding to the display picture element 23.

After such an operation as described hereinabove has been effected in the driving periods T2 through T5 of the remaining row electrode 26, the vertical scanning period TV1 is completed. The switching transistor 24 of the first row electrode G1 becomes conductive again in the driving period T1' of the next vertical scanning period TV2. As shown in FIG. 3 (6), assume that the applied voltage is −v1, and the electric charge corresponding to the liquid crystal capacity of the display picture element 23 is retained, with a result that the driving signal V1i which is the AC rectangular wave form of the amplitude v1 shown in FIG. 3 (7) is applied upon the display picture element 23. The same thing can be said about the remaining the display picture element 23.

In the liquid crystal display apparatus 21 using such switching transistors 24 as described hereinabove, the display voltage while the switching transistor 24 is conductive is normally applied upon the liquid crystal corresponding to the display picture element 23, and the switching transistor 24 is retained in the electric charge even during the interrupting condition, so that the high contrast display may be realized without crosstalk.

The present embodiment is to realize the display including the whole range of the vertical scanning period even when the number of the row electrode 26 is smaller than the number of the scanning lines of the television picture signal to be displayed or ½ the number thereof in the liquid crystal display apparatus 21 of such a display system as described hereinabove. This is a case where the displaying operation is effected on the liquid crystal display apparatus 21 of the row electrode number of the NTSC system by the use of, for example, the television picture signal of the above described PAL system.

Therefore, in the present embodiment, a quiescent circuit 33 composed of the AND circuit 31 so as to prevent for a particular period the scanning pulses from being generated into the row electrode 26 is provided in the row electrode driving circuit 28. The scanning signals are suspended form being generated during a period corresponding to the scanning lines to be thinned out among the television picture signals so that the television picture signals received may not be fed into the display picture element electrode during this period. Thus, the thinning out operation is effected, so that the large effective display range is adapted to be obtained by the display part 22 of the smaller number of row electrodes.

Also, the construction for it is a quiescent circuit 33 in the present embodiment. This is composed of a plurality of AND circuits 31 to which the output for each of the respective bits of the shift register 30 is inputted, with characteristics free from the above described conventional art that the realization may be effected with extreme ease and with the simplified construction by the semiconductor art and the thin film art.

Figure 4:
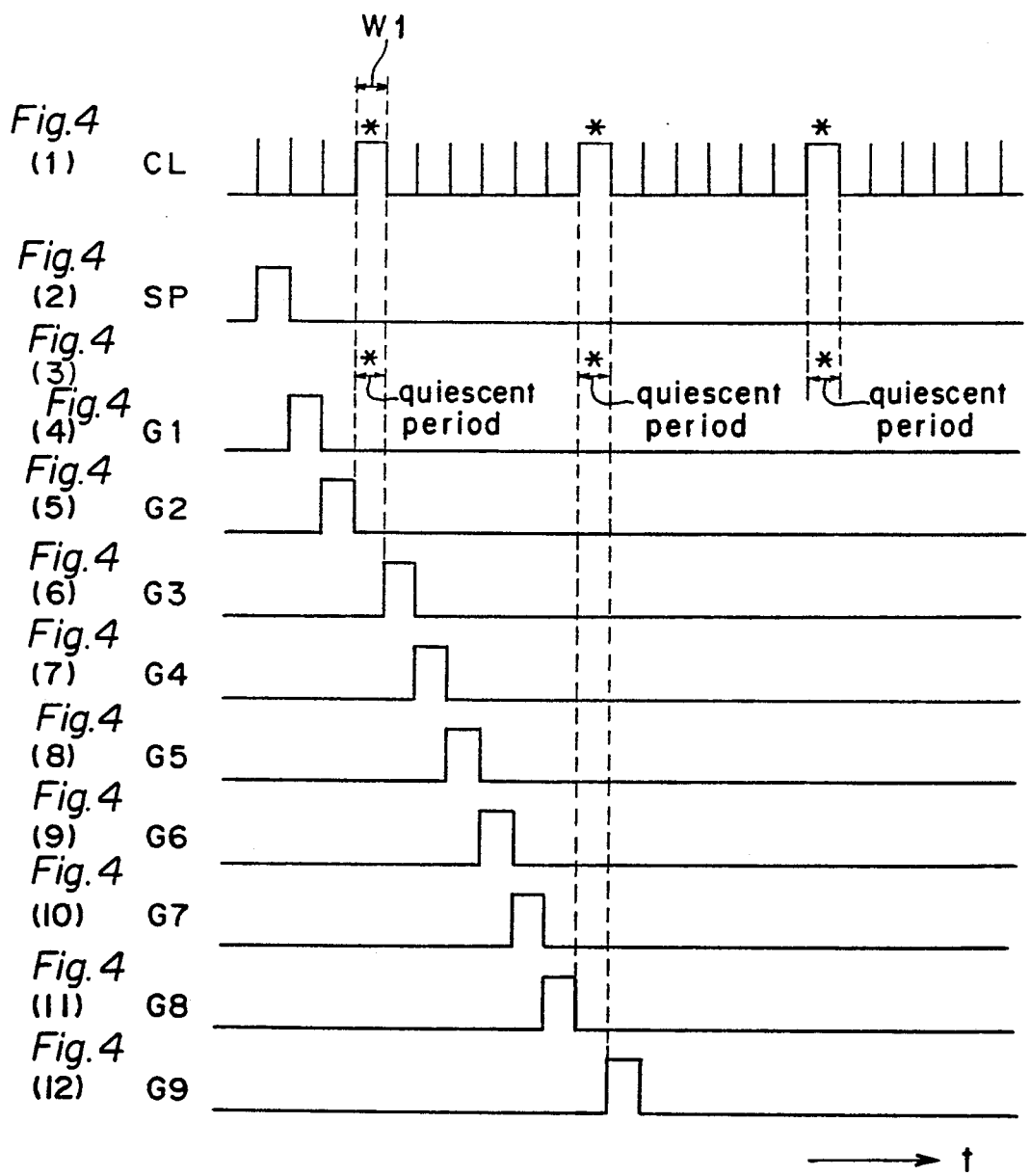
FIGS. 4(1)-4(12) are time charts for illustrating the basic operation of the liquid crystal display apparatus 21 of FIG. 1.

FIG. 4 is a time chart for describing the operation of the present embodiment. The present embodiment will be described with reference to FIG. 1 and FIG. 2. In the following description, the number of the row electrodes 26 is made optional, with the individual reference characters G1, G2, ..., Gn. The clock signal CL to be outputted from the control circuit 29 is a signal synchronized with the horizontal synchronizing signal of the television picture signal, the scanning start signal SP is a signal synchronized with the vertical synchronizing signal. The control circuit 29 outputs a signal which retains the high level condition for a quiescent period W1 only for, for example, every other seven clocks about the clock signal CL as shown in FIG. 4 (1). In the shift register 30, the scanning start signal SP of FIG. 4 (2) is shifted sequentially as shown in FIG. 4 (4) through (12) by the clock signal CL, and is outputted to the respective row electrodes G1 through Gn through the quiescent circuit 33.

At this time, the quiescent period W1 is provided on the clock signal CL. During this period, the shifting operation in the shift register 30 is suspended, and also, the respective AND circuits 31 are interrupted in condition, so that the scanning signals G1, G2, ... are not to be outputted into the row electrode 26. Accordingly, as shown in FIG. 4 (3), the quiescent period W1 of the clock CL becomes the quiescent period at a set timing so as to thin out the scanning lines of the picture signal corresponding to the quiescent period.

At present, the television system adopted in each country is a system with the number of the scanning lines being chiefly 525 (approximately 485 in the number of the effective scanning lines) and being 625 (approximately 576 in it). Assume that the picture signals of a system of 625 in the number of the scanning lines is displayed on the liquid crystal display apparatus 21 for the system use of approximately 525 in the number of the scanning lines, the ratio of the number of the effective scanning lines becomes 485:576=1:1.19. The ratio of the integer close to this ratio is 6:7=1:1.17 or 5:6=1:1.20. It is effective to thin out the scanning lines at the rate of one from six lines or seven lines. When the driving operation of thinning out one line from seven lines has been effected by, for example, the display apparatus of 240 in the number of the row electrodes, the display range equivalent to 240÷6×7=280 is obtained.

Figure 5:
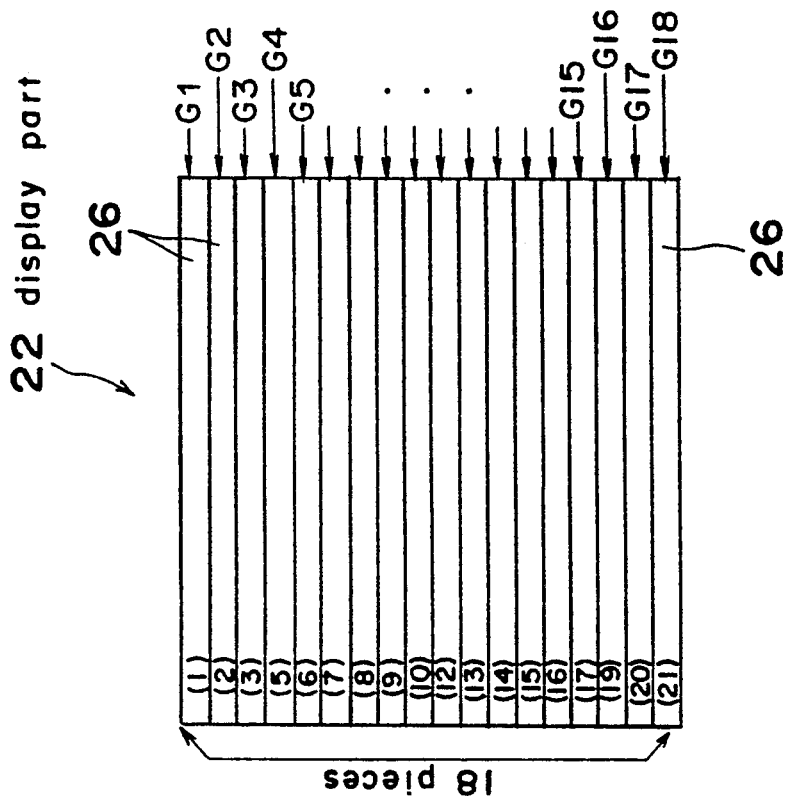
FIGS. 5(1)-5(2) are charts for illustrating another operation example in the present embodiment.
Figure 5:
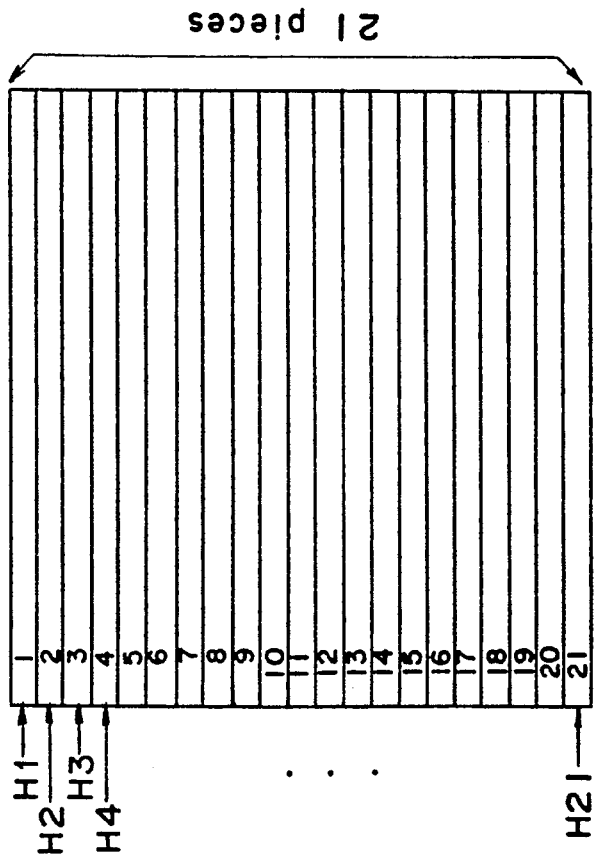

FIG. 5 shows another example of such a thinning out operation. FIG. 6 is a time chart for realizing the example. In the example of the present operation, a case where the scanning lines H1, H2, ... of the picture signal are 21 lines as shown in FIG. 6 (1), namely, the scanning lines H1, H2, ..., H21 constitute one vertical scanning period will be described. When such a picture signal is displayed on the liquid crystal display 21 of 18 lines in the number of the row electrodes to be shown in FIG. 5 (2), the quiescent period W1 is to be set, for example, for every other 7 clocks as shown in FIG. 6 (1) in the clock signal CL described with reference to FIG. 1 and FIG. 4.

According to it, for example, the scanning lines H4, H11, H18 are thinned out, and the horizontal scanning lines H1, ..., H3, H5, ..., H10, H12, ..., H17, H19, ..., H21 are respectively allotted to the row electrodes G1, G2, ..., G18. Thus, the pictures including the range of the whole vertical scanning period comes to be displayed.

In the present embodiment, such a thinning out operation as described hereinabove is effected by the use of such construction as described in FIG. 1, so that the construction of effecting the thinning out processing and so on may be simplified as described hereinabove. Only with only the construction shown in FIG. 1, the things of the deteriorated display quality, and so on are imagined as described later, because the adjacent scanning lines within one frame period are thinned out or the positions of the scanning lines to be thinned out in the even-number fields which are behind time, are positioned on the upper stream side in the vertical scanning direction from the positions of the scanning lines to be thinned out in the odd-number fields.

Namely, although the display is effected for each of the frame periods on the display part 22 when the number of the row electrodes 26 is closer to and smaller than the number of the effective scanning lines, the television picture signal is composed of the repetition of the odd-number field and the even-number field. Thus, the above-described thinning out processing operation is required to be effected for each of the number of the same scanning lines about each of the odd-number field and the even-number field. For example, the positions on the vertical scanning direction of the scanning lines thinned out in the odd-number field and the positions of the scanning lines thinned out in the even-number field are adjacent along the vertical scanning direction when they are seen as one frame with the positions being combined, with a problem that the image quality is deteriorated, because the signal of two continuous scanning lines are not displayed, so that the omission of the signals is recognized visually.

FIG. 7 is a chart for describing the assumed problems. A case where the number of the row electrodes 26 is the ½ or lower of the number of the scanning lines will be described hereinafter. In such a case, the picture signal of the above described odd-number field and the picture signal of the even-number field are alternately applied upon the same row electrode 26. This condition is shown in FIG. 7 (1). In FIG. 7, the solid lines in FIG. 7 show the odd-number fields, the broken lines show the even-number fields. Reference characters $1o$, $2o$, ... show the scanning lines in the odd-number fields, and the reference characters $1e$, $2e$, ... show the scanning lines in the even-number fields.

When the number of the scanning lines agrees with the number of the row electrodes 26, the scanning lines $1o$, $2o$, $3o$, ..., $6o$ of the odd-number fields are allotted to the row electrodes G1, G2, ..., G6 in one field period as shown in FIG. 7 (1), and the scanning lines $1e$, $2e$, ..., $6e$ are respectively allotted in the next field period. Accordingly, the signals of the adjacent scanning lines on the vertical scanning direction of the frame period are respectively given to the respective row electrodes G1 through G6, with the interferences on the display not being caused.

A case is shown in FIG. 7 (2), where the earlier field in time in the thinning out processing operation, namely, the thinning out processing from the odd-number field is effected. Further, the thinning out position of the odd-number field is on the upper stream side in the vertical scanning direction from the thinning out position of the even-number field. In this example, the third scanning line $3o$ of the odd-number field and the fifth scanning line $5e$ of the even-number field are thinned out. Even in this example, the scanning lines adjacent within one frame are allotted to the respective row electrodes 6, and interferences on the display is not caused.

As shown in FIG. 7 (3), when the scanning line $3e$ of the even-number field and the scanning line $6o$ of the odd-number field are thinned out, the scanning line of the even-number field which is late in time is on the upper stream side on the vertical scanning direction. In such a case, the scanning lines $3o$, $4e$; $4o$, $5e$; $5o$, $6e$ which are not adjacent within the frame period are allotted to the same row electrodes G3, G4, G5 as shown in the drawing, with a situation being assumed so that the image quality is deteriorated. As described hereinabove, the thoughtful processing to such situation as described hereinabove is desirable even when the signal processing of thinning out the scanning lines is effected.

FIG. 8 is a block diagram for illustrating the construction in another embodiment of the present invention. The present embodiment is similar to the above described embodiment, with the same reference characters being given to the corresponding parts. In such a concrete circuit example, a modulo-seven counter 34, a thin out position setting circuit 35 and a flip-flop circuit 36 which outputs a switching signal F for switching, for each field, the thinning out position to be set by the thin out position setting circuit 35 are provided concretely as shown in FIG. 7 between the control circuit 29 and the row electrode driving circuit 28.

A scanning start signal SP which is synchronized with the vertical synchronizing signal of the picture signal, a clock signal CL which is synchronized with the horizontal synchronizing signal, a vertical synchronizing signal VS and a mode switching signal SW are outputted from the control circuit 29. The mode switching signal SW is a signal for selecting either of the operation of effecting the thinning out processing of the operation of the liquid crystal display apparatus 21 and of the operation of displaying the scanning lines of the picture signal to be inputted in accordance with 1:1 with respect to the respective electrodes. In the present embodiment, the displaying operation including the thinning operation is effected when the level of the mode switching signal SW is at high level.

The modulo-seven counter 34 is provided with a counter 37 of three bits to which the clock signal CL is inputted, so that the outputs of the respective bits Q2, Q1, Q0 are inputted in parallel into the thinning out position setting circuit 35, and also, are inputted into the NAND circuit 38. The output of the NAND circuit 38 is inputted into a latch circuit 41 composed of a pair of NAND circuits 39, 40. In the latch circuit 41, the wave form synchronized with the clock signal CL is shaped in the inputting operation of the output of the NAND circuit 38 into the resetting terminal R of the counter 37 as the reset signal.

The output of the latch circuit 41 is inputted into the NAND circuit 42, a signal with the vertical synchronizing signal VS of the picture signal being inverted by the inversion circuit 43, and a mode switching signal SW are inputted into the NAND circuit 42.

The vertical synchronizing signal VS is inputted into the clock terminal of the flip-flop circuit 36 for switching the thinning out position in the thinning out position setting circuit 35 to be described for each field. The flip-flop circuit 36 is connected with the data input terminal D in the inversion output Q, and the output terminal Q is inputted into the exclusive or circuit (hereinafter referred to as XOR circuit) 44 of the thin out position setting circuit 35. The most significant bit Q2 of the counter 37 is inputted to the XOR circuit 44 of the thin out position setting circuit 35, and the output thereof is inputted into the NAND circuit 45. The inversion signal by the inversion circuit 46 of the bit Q1 of the counter 37 and the lest significant bit Q0 are inputted into the NAND circuit 45.

The output of the NAND circuit 45 is inputted into the NAND circuit 48 to which the inversion signal by the inversion circuit 47 of the clock signal CL is inputted. The output thereof is inputted to the clock input terminal CK of the shift register 30 as the clock signal CL1, and also, is inputted in common into the AND circuit 31 of the quiescent circuit 33 through the inversion circuit 32.

FIG. 9 is a timing chart for describing the operation of the construction shown in FIG. 8. The operation of the present embodiment will be described with reference to both FIG. 8 and FIG. 9. The scanning start signal SP, the clock signal CL and the vertical synchronizing VS are fed as shown in FIG. 9 (1) through (3), and the output of the NAND circuit 42 becomes high in level by the vertical synchronizing signal VS in the modulo-seven counter 34 so as to reset the counter 37. Thereafter, the counter 37 is counted up for each clock signal CL as shown in FIG. 9 (2).

The counter 37 of three bits counts the count values 0 and 7. Although the output of the NAND circuit 38 is at a high level in the remaining count values 000 through 110, the level is switched into the low level in the outputs (Q2, Q1, Q0)=(1, 1, 1). Therefore, the output of the NAND circuit 42 is inverted from the low level into the high level so as to reset the counter 37. In this manner, the modulo-seven counter 34 shown in FIG. 7 may realize the modulo-seven count between 0 through 6 by the use of the counter 37 with three bits.

(1) In a case where the switching signal F is at a high level.

In a case where the switching signal F is at a high level, the quiescent signal ST which is the output of the NAND circuit 45 becomes a low level, and the clock signal CL1 is not fed from the NAND circuit 48 in a case wherein all the inputs of the NAND circuit 45 become at a high level, and in a case of the (Q2, Q1, Q0)=(0, 0, 1). Accordingly, when the count value of the counter 37 is 0 as shown in FIG. 9 (4), the quiescent signal ST which is the output of the NAND circuit 45 is at a high level, and the clock signals CL is outputted through the NAND circuit 48. Therefore, the scanning start signal SP is shifted by one clock portion by the shift register 30. Also, the respective NAND circuits 31 also become conductive, and the scanning signal G1 is guided to only the row electrode G1 as shown in FIG. 9 (6) through (8) among the row electrodes G1 through Gn.

When the count value of the counter 37 becomes 1, the quiescent signal ST becomes a low level, and is interrupted in the NAND circuit 48, so that the clock signal CL1 is fixed to the high level. Thus, the shift register 30 is suspended at its shift operation and also, the respective AND circuits 31 are also interrupted. Therefore, in the quiescent period W1 of the time t1 through t2, the signal corresponding to the scanning line of the picture signal to be inputted into the liquid crystal display apparatus 21 will not displayed on the display part 22. Hereinafter, the remaining row electrodes G2, G3, . . . are sequentially selected in accordance with the increase in the counter value of the counter 7, with the above described operation being repeated at the period of the modulo-seven counter 34 using the counter 37.

(2) In a case where the switching signal F is at a low level.

The conditions under which the quiescent signal ST becomes a low level at this time is (Q2, Q1, Q0)=(1,0,1). Accordingly, as shown in FIG. 9 (9) through (13), the quiescent signal ST falls into the low level from the high level when the counter value of the counter 37 is 5. In the quiescent period W1, either of the row electrodes G1 through Gn is not selected as described hereinabove. The respective electrodes G1 through Gn are sequentially selected as in the above described description in the case of the remaining count value.

Although a case where the mode switching signal SW is at a high level is illustrated in the above description, the output of the NAND circuit 42 is fixed at the high level, and the counter 37 is fixed into the resetting condition if the signal is at a low level. The quiescent signal ST which is the output of the NAND circuit 45 is fixed at the high level so that the NAND circuit 48 is retained in the conductive condition. The clock signal CL is inputted through the inversion circuit 47, the NAND circuit 48 into the clock input terminal CK of the clock input terminal CK of the shift register 30. The clock signal CL1 at this time becomes the same as the clock signal CL as shown in FIG. 9 (15).

According to the present embodiment, the thinning out processing of one line among seven lines on the scanning lines of the picture signal to be inputted is effected. The picture range across the whole vertical scanning period of the picture signal may be realized on the display part 22. Also, according to the construction shown in FIG. 8, the thinning out positions are switched for each field so that the scanning lines to be thinned out may not become adjacent when seen in the one frame. Thus, the scanning lines to be thinned out are made adjacent within one frame to prevent the display quality from being deteriorated.

In the above described embodiment, although the position of the scanning line to be thinned out for each field is to be switched, the flip-flop circuit 36 in FIG. 8 as another example of the present invention may be changed into the known field discriminating circuit which is capable of effecting discrimination between the odd-number field and the even-number field, and in the case of the odd-number field, the position of the scanning lines to be thinned out within the vertical scanning period may be provided on the upper stream side in the vertical scanning direction instead of the position of the scanning lines to be thinned out in the even-number field. Accordingly to the example of FIG. 8, the switching signal F has only to be made high at level in the odd-number field, and the switching signal F has only to be made low at level in the even-number field. Such construction may prevent a situation that the picture signals corresponding to the scanning lines which are not adjacent about the vertical scanning direction are allotted with respect to the same row electrode 26 described with reference to FIG. 7, and also, prevent the deterioration of the display quality about this point. Also, since the mode switching signal SW has been set, the coping operation may be effected with respect to a system with the number of the scanning lines being different therein, so that the convenience may be considerably improved.

Although an operation of thinning out one line of seven lines in the number of the scanning lines has been described in each of the above described embodiments, it is needless to say that one line may be thinned out from the scanning lines of the other number.

Also, although each of the embodiments has been described as the liquid crystal display apparatus 21, it may be widely carried out with reference to the display apparatus of the other matrix systems.

As is clear from the foregoing description, according to the arrangement of the present invention, when the number of the row electrodes provided on the display means is smaller than the number of the scanning lines during one vertical scanning period of the picture signal in the displaying operation of a plurality of display picture elements on the display means arranged in the matrix shape, the stop signal generating means is adapted to output to the row line selecting means a stop signal which stops across the predetermined stop period the selecting operation of the row line selecting means for every other number of the horizontal synchronizing signals predetermined. Therefore, even when the number of the row lines of the display apparatus is smaller than the number of the scanning lines of the picture signal, the pictures within the whole range of the vertical scanning period may be displayed by the use of the brief construction.

Also, the stop signal is adapted to generate the output time within one frame of the picture signal so that at least one horizontal scanning period may be emptied along the vertical scanning direction. Therefore, a situation is prevented, in which the scanning lines thinned out for each of the fields become adjacent in the vertical scanning direction within one frame when the thinning out processing operation is effected for each of the fields of the picture signal, thus preventing the display quality from being deteriorated.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. In a display apparatus including a display device with a plurality of display picture elements being arranged in a matrix shape, a plurality of row electrodes for sequentially selecting one of a plurality of display picture elements in the row direction along a horizontal scanning direction, a plurality of column electrodes for applying voltage upon the plurality of display picture elements along the column direction, with the display being effected in accordance with input picture signals, a display drive system comprising:

row electrode selecting means for sequentially selecting each of the respective row electrodes;
 column electrode driving means for outputting the voltage, corresponding to the input picture signals, into the respective column electrodes; and
 stop signal generating means for outputting a stop signal, during stop periods of a predetermined duration corresponding to one horizontal scanning period, to inhibit the selecting operation of the row electrode selecting means from driving any of the row electrodes so as to inhibit the selection operation during the stop periods within one frame so that an input picture signal corresponding to a stop period in each one frame is not displayed.

2. Display drive apparatus for displaying an input picture signal on a display device including a liquid crystal display device which comprises a plurality of data electrodes arranged in parallel in a first direction and a plurality of scan electrode arranged in parallel in a second direction, perpendicular to the first direction, the display drive apparatus comprising:

scan electrode drive means, operatively connected to the plurality of scan electrodes, for sequentially driving each of the plurality of scan electrodes; and
 stop signal generating means, operatively connected to the scan electrode drive means, for selectively inhibiting said scan electrode drive means from driving any of the plurality of scan electrodes during a predetermined period based upon a preselected thinning out ratio.

3. The display drive apparatus of claim 2, wherein the preselected thinning out ratio of the stop signal generating means is based upon a ratio of a number of scan electrodes of the display device to a number of effective scanning lines of the picture signal inputted to the liquid crystal display device for one frame or for one field.

4. The display device apparatus of claim 3, wherein the stop signal generating means selectively inhibits driving of a scan electrode, every nth scanning line of picture signal input, n being an integer such that an integer ratio denoted by $(n-1)/n$ is approximately equal to the ratio of the number of scan electrodes to the number of effective scanning lines of the input picture signal.

5. A method of driving a display device to display an input picture signal on a display device including a plurality of data electrodes arranged in parallel in a first direction and a plurality of scan electrodes arranged in parallel on a second direction, perpendicular to the first direction, the method comprising the steps of:

(a) sequentially driving each of the plurality of scan electrodes through a scan electrode drive device; and (b) selectively inhibiting the scan electrode drive device from driving any of the plurality of scan electrodes based upon a preselected thinning out ratio, so that an input picture signal which has its number of scanning lines being greater than the number of scan electrodes of the display device can be displayed.

6. The method of claim 5, wherein the selective inhibiting of said step (b) is based upon a thinning out ratio preselected according to a ratio of a number of scan electrodes to a number of effective lines of the input picture signal.

7. The method of claim 6, wherein selective inhibiting of the scan electrode drive device occurs at every nth scanning line of picture signal input, n being an integer such that an integer ratio denoted by $(n-1)/n$ is approximately equal to the ratio of the number of scan electrodes to the number of effective scanning lines of the input picture signal.

* * * * *